Oct. 4, 1960     H. HACK     2,954,711

METHOD AND MACHINES FOR BALANCING ROTORS

Filed Oct. 24, 1958     5 Sheets-Sheet 1

Oct. 4, 1960         H. HACK         2,954,711

METHOD AND MACHINES FOR BALANCING ROTORS

Filed Oct. 24, 1958         5 Sheets-Sheet 3

FIG.4

United States Patent Office 2,954,711
Patented Oct. 4, 1960

2,954,711

METHOD AND MACHINES FOR BALANCING ROTORS

Heinrich Hack, Darmstadt, Germany, assignor to Carl Schenck Maschinenfabrik G.m.b.H., Darmstadt, Germany, a corporation of Germany Filed Oct. 24, 1958, Ser. No. 769,423

Claims priority, application Germany Nov. 7, 1957

18 Claims. (Cl. 77—5)

My invention relates to the balancing of rotatable workpieces and particularly to methods and machines for obtaining rotational balance of a previously unfinished or only partly finished workpiece without subjecting it to an unbalance correcting operation other than the ordinary machining or fabricating work anyhow required for finishing the workpiece.

Such a method, for example, is the known balance-centering according to which the workpiece, while its unbalance is being measured in a balancing machine, is subjected to displacement during rotation until the main inertia axis of the workpiece coincides with the axis of rotation. It has also been proposed to perform the balance centering in a modified manner, namely by adjusting the above-mentioned two axes not to strict coincidence but to a predetermined amount of discrepancy so that the workpiece retains a given residual unbalance which anticipates a subsequently necessary machining of the workpiece periphery about the axis of rotation. Such subsequent machining, for example on a lathe, then has the effect of balancing the workpiece. The advantages of such balance centering methods are particularly significant where rotors, such as crankshafts or clutch members, are being processed in assembly-line production.

In the known machines for performing the balance-centering method outlined above, a satisfactory degree of accuracy of the final balance can be attained only by meeting extremely exacting requirements as regards the devices used during continuous rotation of the workpiece for displacing the workpiece relative to its carrier. Furthermore, the known method has been applicable only in cases where the finishing of the workpiece is done by lathe work or similar machining concentrically about the axis of workpiece rotation, and there are many instances where the finishing work necessary for placing the workpiece into the prescribed final shape must be of a different kind requiring, for example, a non-peripheral drilling or milling operation with the tool feed in parallel and spaced relation to the axis of workpiece rotation.

It is an object of my invention to improve balance centering methods and machines generally of the above-mentioned kind toward improved accuracy and reliability of the balancing condition produced by the final machining required for normally finishing the workpiece. Another object is to provide a method and means capable of establishing balance in a rotatable workpiece by a machining or other fabricating operation which prescribed for finishing the workpiece, which is of the non-peripheral type, that is which does not occur, like lathe work, about the axis of workpiece rotation.

The invention will be further explained with reference to the drawings in which:

Fig. 4 illustrates components of the same machine in conjunction with a schematic circuit diagram of its electric accessories.

Figure 1A:
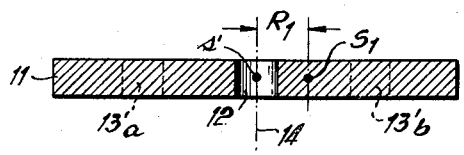
Fig. 1a shows a cross-section of a workpiece to be balanced and finished by drilling.
Figure 1B:
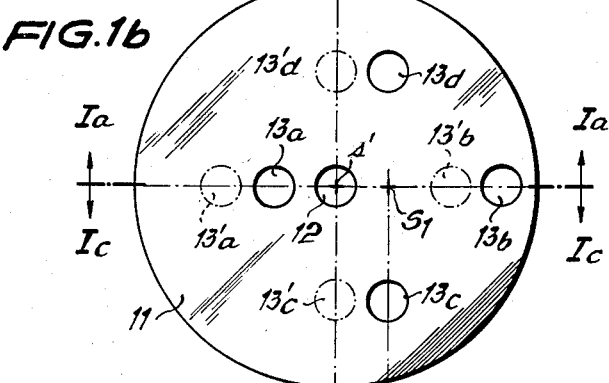
Fig. 1b shows a top view of the same workpiece in finished condition, and Fig. 1c a cross-section of the finished workpiece corresponding to Fig. 1b.
Figure 1C:
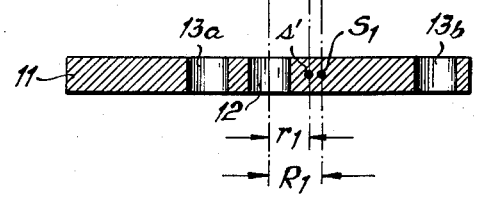
Figure 2:
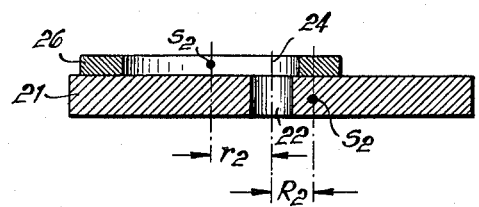
Fig. 2 shows a cross-section of another workpiece and, like Figs. 1a to 1c, serves for explanatory purposes mainly.

The method according to the invention, briefly outlined above, will first be explained theoretically in conjunction with two examples, namely, the finishing of a smooth circular disc 11 with a central bore 12 as shown in Figs. 1a to 1c which is to be provided with a number of bores 13, and the finishing of a circular disc 21 with a central bore 22 as shown in Fig. 2 which is to be joined with a spacer ring 26. The balance-centering by off-center finishing can be done on the machines more fully described below with reference to Figs. 3 to 6; but at first a brief description of the method will be given mainly with reference to the desired operations to be performed.

Referring to the workpiece shown in Figs. 1a and 1b, it is to be understood that the illustrated disc 11 is to be provided with a number of ventilating holes 13a to 13d. At first, the disc 11 is mounted on a balancing machine (such as one of those described below), and is centered in the conventional manner, namely so that the geometric axis of the disc 11 coincides with the axis of rotation. By applying the conventional balance analysis it is found that the gravity (mass) center $S_1$ of disc 11 is spaced a distance $R_1$ from the axis of rotation 14. When finished, the disc 11 is supposed to have four ventilating holes all of the same diameter. Assume that the mass center of such four holes $13'a$ to $13'd$ (shown by dot-and-dash lines) would be located on the rotational axis 14 if these holes were symmetrically distributed about the axis 14. If such four holes were produced by drilling, the disc, when finished, would remain unbalanced because the mass center $S_1$ does not coincide with the axis of rotation 14. However, before drilling the holes, the disc 11 is displaced off center relative to the chuck or other carrier of the balancing machine on which the disc is mounted. The displacement is given an amount that corresponds to the previously measured unbalance in such a sense that the mass center $s'$ of the holes still to be drilled is shifted closer to the mass center $S_1$ of the disc, so that the condition of equilibrium relative to the rotation axis 14 is satisfied: $S_1.R_1 = r_1.s_1$. This setting of disc 11, with mass center $S_1$ displaced toward mass center $S_1$ is schematically illustrated in Fig. 1c. When the disc is set to this position, the drills which with the original setting would have drilled the assumed holes $13'a$ to $13'd$, will drill the off-center group of holes $13a$ to $13d$ into the disc, these holes being shown by full lines to Figs. 1b and 1c. It will be noted that the ventilating holes $13a$ to $13d$ thus produced have a common gravity center $s_1$ whose amount of spacing $r_1$ from the axis of rotation 14 results from the quotient:

$$r_1 = \frac{\text{unbalance (mmg.)}}{\text{weight of material drilled out } (g)}$$

The disc 11 thus provided with an off-center group of ventilating holes is inherently balanced about its axis of rotation 14 and thus does not require any unbalance correction aside from that inherently produced by merely finishing the disc by drilling.

In the de-centering example according to Fig. 2, it is assumed that the mass center $S_2$ of the disc 21, determined by measuring its unbalance, be located a distance $R_2$ away from the axis of rotation 24. The disc 21 is to be finished by adding thereto a spacer ring 26. The mass center $s_2$ of ring 26, for satisfying the balancing method according to the invention, must be located at such a distance $r_2$ from the axis 24 as to satisfy the equation $S_2.R_2 = s_2.r_2$. In practice, this requirement can readily be met, for example, by correspondingly welding the ring 26 onto the disc 21 at the properly chosen location.

It will be understood that for explanation, the departures of the various mass centers (centers of gravity) from the axis of rotation in Figs. 1a through 2 are shown greatly exaggerated.

The above-described balancing method according to the invention can be performed by properly setting the drills or other fabricating tool means with respect to the workpiece which is to be machined at de-centered locations, or by correspondingly setting the workpiece relative to the fixed machining device, or also by setting the workpiece as well as the machine device, each time in accordance with the unbalance data found to apply to the particular workpiece; and these data can be located either by means of the same machine in which the final fabrication is to be effected or outside of that machine with the aid of a separate conventional balance analyzing machine. The just mentioned setting operations are preferably effected automatically so as to require no particular attention from the attendant, as will be apparent from the machines described presently with reference to Figs. 3 to 6.

Figure 3:
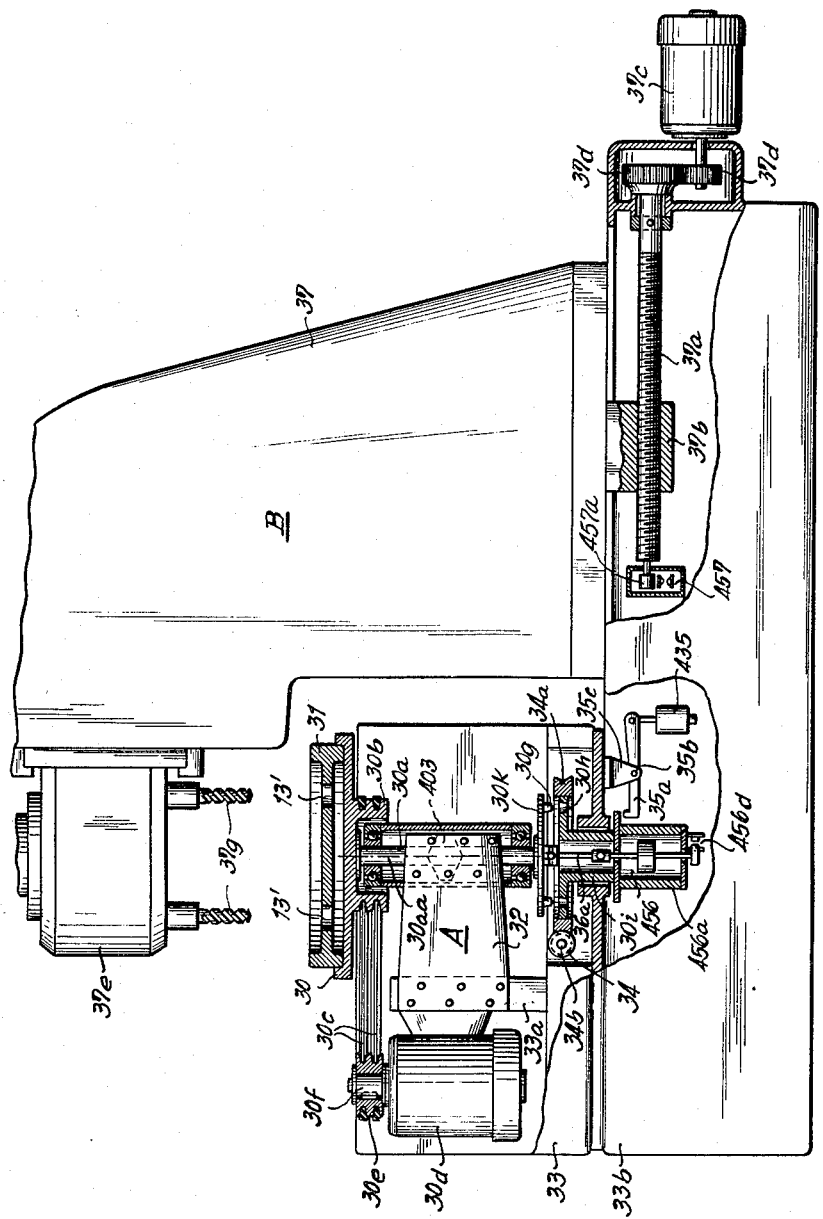
Fig. 3 shows partly in section a side view of a balancing machine according to the invention.

The machine illustrated in Figs. 3 and 4 is designed for determining unbalance in accordance with a polar coordinate method.

The disc-shaped workpiece 31 (Fig. 3) which is supposed to be finished by drilling predetermined bores 13' is located in the workpiece holder or chuck 30 of the balancing machine A. The holder 30 is mounted on a vertical spindle 30a which runs in ball bearings and is provided with a belt sheave 30b to be driven through an endless V-belt 30c from a belt sheave 30e on the shaft 30f of an electric motor 30d. The sleeve-shaped journalling structure on which the ball bearings for spindle 30a are mounted is fastened to two horizontal leaf springs 32 of which only one is visible in Fig. 3, the other is located behind the one shown. The two leaf springs are fastened to a rigid vertical part 33a of the machine frame structure 33 which also supports the drive motor 30d. The springs 32 permit the vertical spindle 33a to perform linear oscillations toward and away from the observer when the workpiece 31 is in rotation, such oscillations being caused by any unbalance inherent in the workpiece.

The spindle oscillations are sensed by an electric transducer 403 (Figs. 3, 4) such as on electrodynamic pickup of the moving coil type. The pickup translates the oscillations into equivalent alternating currents or voltages which are applied to two instruments 401, 402 (Fig. 4), preferably of the same type, that respond to the magnitude of the pickup voltages. The instrument 401 (Fig. 4) may visibly indicate the measured magnitude if desired, but serves mainly for the automatic control of the machining operation which is to take place subsequently in de-centered relation to the axis of rotation in order to finish the workpiece and to also eliminate the measured unbalance. The other instrument 402, likewise receiving voltage from the pickup 403, also contributes to providing for the just-mentioned automatic control as will be described in detail hereinbelow.

Mounted on the lower end of the spindle 30a (Fig. 3) is a disc 30k which carries conical stop bosses 30g and forms part of an arresting device for locking the workpiece carrier 30 in proper position for the predetermined finishing operation. The device comprises an electromagnet 435 (Figs. 3, 4) whose armature is linked to a lever 35a pivoted at 35b to a bearing block 35c which is rigidly mounted on the stationary machine frame structure. The lever 35a, when actuated by magnet 435, acts upon a sleeve 30i which carries a disc provided with stop holes. When lever 35a pushes the sleeve upward, the holes 30h become engaged with the bosses 34a and prevent further rotation of disc 30k and of the spindle 30a rigidly connected therewith. For releasing the locking engagement, the magnet 435 is deenergized and returns the lever 35a into the illustrated position. The sleeve 30i then slides under its own weight downwardly and disengages the stop bosses 30g from the holes 30h.

Connected with the spindle 30a through a Cardanic (universal-joint) shaft 36A is the magnetic rotor 456' (Figs. 3, 4) of an auxiliary dynamo-electric generator 456 which serves as phase reference transmitter and is provided with two sets of stator coils 456h and 456v (Fig. 4). Two sinusoidal currents of 90° phase displacement relative to each other (sine current and cosine current) are generated in the respective coils by rotation of the rotor 456. These two phase reference currents are in synchronism with the workpiece rotation. Also joined with spindle 30a through the universal-joint shaft 36a is a cam switch 456d (Figs. 3, 4) which closes its contact once during each rotation of the workpiece.

The sleeve 30i is firmly joined with the stator 456a of the generator 456 and carries a coaxial worm gear 34a. Gear 34a meshes with a worm 34 on a shaft 34b journalled on the stationary frame structure of the machine. Shaft 34b is connected with a reversible control motor 404 (Fig. 4) and serves to rotate the stator 456a when determining the angular position of the workpiece unbalance. For the purpose of lucid illustration, the stator 456a and the worm 34 with shaft 34b are shown twice in the diagram of Fig. 4 where an endless belt transmission 456F connecting the two illustrated shafts is indicated merely for the purpose of explanation. That is, only one worm gearing in direct connection with the control motor 404 is actually used in accordance with the illustration in Fig. 3.

Aside from the balancing machine so far described, the machine set is provided with a machining portion B whose supporting structure 37 is mounted, beside the frame structure 33 of the balancing equipment, on a common base 33b (Fig. 3). The machine tool proper, in the illustrated embodiment, consists essentially of a multi-spindle drilling machine 37e which is mounted on the support 37. The support 37 is seated on a horizontal slideway and is horizontally displaceable by means of a feed screw spindle 37a in threaded engagement with a nut 37b rigidly joined with the support 37. The spindle 37a is driven through a spur gear transmission 37d from a tool setting motor 37c. The motor 37c is reversible, but only its controls for forward run are shown.

For performing the method according to the invention, the unbalance inherent in the workpiece 31 must be determined as to magnitude and angular position, after the workpiece is mounted on the holder 30 in geometrically centered relation thereto, and after the influence of the predetermined machining to be effected by the drills 37g is anticipatingly ascertained. The devices for determining the unbalance as well as the anticipated effect of the subsequent machining, as well as the device for thereafter controlling the machining operation in accordance with the predetermined data are preferably mounted in a separate housing (not illustrated) to be installed on the machine or at a suitable location as separate from the machine. These measuring and control devices will now be further described with reference to Fig. 4.

The measuring and control devices comprise the above-mentioned two watt-metric instruments 401 and 402. Instrument 401 serves for accurately measuring the magnitude of unbalance and for thereafter controlling the de-centering of the machining tools in accordance with the measuring result. The instrument 401 has fixed field coils 401h which receive sine current from the stator coils 456h of the phase reference generator 456. The moving coil 401a of instrument 401 receives voltage from the oscillation pickup 403 through an adjustable control rheostat 403a. During operation, that is during the measuring run of the workpiece, the moving coil 401a deflects from its zero position an amount dependent upon the component pickup voltage which is in phase with the reference current from generator 456. The moving coil 401a is provided with a contact member 401e which participates in the deflecting movement and then travels along a series of fixed bank contacts 401r. The contact arm 401c may also serve as a pointer for visually indicating the deflected position and thus also the magnitude of unbalance measured.

The wattmetric instrument 402 serves for automatically determining the angular position of unbalance. The fixed field coil 402v is connected with the coils 456v of the phase reference generator 456 and thus is traversed by sinusoidal current (cosine current) 90° phase displaced from the reference current flowing in the field coils 401h of instrument 401. The moving coil 402a of the auxiliary wattmeter 402 receives voltage from the oscillation pickup 403 in parallel relation to the moving coil of instrument 401 but its deflection is dependent upon the component of the pickup voltage that is 90° phase displaced from that responded to by the instrument 401. The wattmeter 402 controls the reversible operation of the above-mentioned drive motor 401 for the worm gear 34 serving to angularly displace the stator 456a of the phase reference generator 456.

The control assembly further includes a continuously operating pulse transmitter 407 for cooperating with the wattmeter 402 in controlling the operation of the worm drive motor 404. The pulse transmitter 407 comprises a continuously running auxiliary motor 407a whose shaft operates an eccentric cam 407b acting upon an on-and-off switch 407c. The worm drive motor 404 is provided with two field windings 404f and 404r. The motor is at rest when both field windings are de-energized and will run in the forward or reverse direction depending upon which of the field windings 404f, 404r is energized at a time. The motor is selectively energized through an electromagnetic relay 406 whose two control contacts 406a and 406b are normally open and become selectively closed depending upon whether one or the other control winding of relay 406 is energized through respective leads 406c from one or the other of two fixed contacts 402e, 402f in wattmeter 402. When the moving coil 402a and the contact arm 402c attached thereto are in zero position, the relay 406 is inactive and the motor 404 at rest. When the coil 402a and arm 402c are deflected to one or the other side, thus engaging 402e or contact 402f, the worm drive motor 404 runs in one or the other direction.

The above-described stop magnet 435, worm drive motor 404, switch 406 and some of the accessory components described below are energized from a direct-current supply line 410. The wattmetric instruments 401 and 402 are each provided with a contact member 401b and 402b which is engageable with the respective movable contact arms 401c and 402c and arrest these arms in the deflected positions previously reached, provided voltage from current supply line 410 is applied to the contact member 401b or 402b. This can take place only when a normally open contact 405h₂ is closed. This contact forms parts of a control or limit switch as will be further described below.

The above-mentioned pulse transmitter contact 456d (Figs. 3, 4) is mounted on the stator housing of phase reference generator 456 so as to be angularly adjusted together with the stator of the phase reference transmitter due to operation of the worm drive motor 404 (Fig. 4).

Consequently, the closing of pulse contact 456d by rotation of cam 456c takes place at a point of cam rotation that is determined by the angular setting of the generator stator. The pulse contact 456d is connected in series with the stop magnet 435 between the busses of the current supply line 410 under control by a centrifugal switch 456e which is actuated by centrifugal force due to the rotation of the workpiece and thus closes only when the rotor speed is below a given value. The centrifugal switch 456e thus prevents premature operation of the stop magnet 435 at an unsuitably high speed of workpiece rotation.

Another pulse transmitter 457 (Figs. 3, 4) is actuated by the feed screw spindle 37a during operation of the tool setting motor 37c and hence while the tool support 37 is being shifted from the zero position to the illustrated (Fig. 3) de-centered working position. The pulse transmitter 457 comprises a cam 457a (Fig. 4) mounted on the feed spindle 37a, and a contact pair 457d periodically closed by cam 457a. The contacts are connected at point 457f to the supply line and have a pulse output terminal 457 electrically connected with point 457f only during the short interval of time in which the contacts 457d are closed.

The pulse transmitter 457 cooperates with a stepping device 405. This device has a rotatable contact arm 405a sequentially engageable with the stationary contacts of a bank 405r which is interwired by a manifold connection 405y with the respective contacts in the bank 401r of the wattmetric instrument 401. The movable contact arm 405a in stepping device 405 is rigidly joined with a second arm 405c which participates in the travel produced by a switching pawl 405b under control by the armature of a stepping magnet 405g which, when actuating the pawl 405b also actuates a self-interrupter switch 405d.

The stepping device 405 is started by the closing of a switch contact 405e. This switch may be closed manually after the balancing run is completed and the machine tool is to be set to the proper position. However, the switch 405e may also be closed automatically by a timing mechanism switched on at the moment when the balancing run is commenced, the timing period being such that the switch 405e will close upon completion of the balancing run, that is after the moving coils of both instruments 401, 402 have reached their deflected positions. The closing of switch 405e applies voltage to the stepping magnet 405g through the normally closed contact of an electromagnetic relay 405f and through the contact 405h₁ of a two-pole switch whose other contact 405h₂ shown between instruments 401 and 402 and mentioned above simultaneously connects the contact arms 401c and 402c of respective instruments 401 and 402 to the line 410. Each time the stepping magnet 405g switches the arms 405a and 405c one step forward, the interrupter contact 405d temporarily opens the circuit of the stepping magnet so that its armature moves away from the stepping magnet and again closes the interrupter contact 405d. Then the stepping magnet 405g receives another current pulse and switches the arms 405a and 405c another step forward. This operation repeats itself until the coil of relay 405f receives voltage through contact arm 405a and opens its contact thus stopping the further operation of the stepping magnet. The voltage for the coil of relay 405f is supplied from the plus pole of line 410 through switch contact 405h₂, arm 401c in instrument 401, bank contact 401x, and one of the manifold leads 405y. Hence, the stepping device 405 operates as a line finder and its arms 405a and 405c will stop as soon as they have reached a position that corresponds to the deflection of the contact arm 401c in instrument 401.

Thereafter, the same stepping magnet 405g is controlled by the pulse transmitter 457 in dependence upon the feed motion of the tool support required for setting this support from the starting or zero position to the correct de-centering position in which the machining tools are off center with respect to the axis of workpiece rotation as required for establishing unbalance by the subsequent machining operation.

In principle, the stepping device 405 may be of the type in which the contact arm 405a, when controlled by the self-interruper switch 405 travels forward, and when thereafter controlled by the pulse transmitter 457 travels in reverse back to the zero position. This would require two stepping magnets 405g or some other reversing mechanism which causes the contact arm 405a to travel forward when the self-interrupter 405d is in operation but to travel in the reverse direction when the pulse transmitter 457 operates. However, for permitting the use of a simpler stepping mechanism, the stepping switch in the illustrated embodiment is so designed that the contact arm 405a always travels in one and the same direction (clockwise) and, after passing through the entire range of travel, again reaches the zero position. For this purpose the bank contact 405r of the stepping switch may extend over a full circle or, preferably and as conventional with commercially available stepping switches in general, the bank of contacts covers only a portion of the pheriphery but the arm 405a is mechanically and electrically connected with another arm which passes onto the zero contact of the bank after the precedingly active contact arm leaves the ultimate contact of the same bank. For simplicity only one contact arm 405a is shown in Fig. 4, but it should be understood that when contact arm 405a leaves the ultimate contact of the bank 405r, always stepping clockwise, the next switching step will place it on to the zero contact so that the travel cycle can be repeated.

The contacts of the bank 401r in instrument 401 and the contacts of bank 405r in stepping device 405 are interwired by the manifold connection 405y in such a manner that the first contact of bank 401r in instrument 401 is electrically connected by one of the manifold leads with the ultimate contact of bank 405r in device 405, while the second contact of bank 401r in instrument 401 is connected with the penultimate contact of bank 405r in device 405, and so forth. Consequently, when for example the contact arm 401c in instrument 401 is deflected to, and arrested on, the second bank contact, the arm 405a in stepping device 405 must subsequently travel clockwise along the bank 405r until it reaches the penultimate contact before a connection between arms 401c and 405a is established. It will be recognized that, when this is the case, the subsequent travel of arm 405a in device 405, required for advancing the arm over the ultimate bank contact back to the starting contact, corresponds to a travel distance porportional to the amount of deflection of arm 401c in instrument 401.

The second arm 405c of stepping device 405 cooperates with a limit contact 409 so arranged that it is open only when the arm 405c, as well as the arm 405a are in zero position. Consequently, whenever the stepping device 405 is in operation with arms 405a and 405c displaced from the zero position, the limit switch 409 is closed, but it will thereafter open as soon as the arm 405c advances from the position previously occupied to the zero position.

The limit switch 409 is connected in the energizing circuit for the coil 413b of a contactor 413 that controls the supply of current from a three-phase alternating-current line to the tool setting motor 37c. Although switch 409 closes as soon as arm 405c, during the first switching step, moves away from the zero position, the coil circuit of contactor 413 remains interrupted by a normally open control switch 413a. Hence, the contactor 413 can pick up and the tool setting motor 37c can run only when both switches 409 and 413a are closed simultaneously.

As explained, the anticipated effect of the predetermined machining operation, i.e. the drilling of the holes 13', upon the balance condition of the workpiece can be calculated or can be determined by balance measuring test. This effect is then posted into the control system by setting the displaceable tap contact 403 of control rheostat 403a into the corresponding position. The control rheostat thus set modifies the voltage impressed from the pickup 403 upon the moving coil 401a. The result is essentially a sensitivity control which corrects the deflection of the moving coil 401a and contact arm 401c in instrument 401.

Before turning to the operation of the system as a whole, it may be added that while the foregoing devices for automatically controlling the horizontal setting of the tool support 37 are described with reference to the drawings, the drive means for operating the drills 37g and for feeding these drills toward and through the workpiece are not illustrated because they need not differ from those conventionally known and used for such purposes. If desired, the operation of the drills and their vertical feed may also be controlled automatically, for example as illustrated and described in my Patent No. 2,810,307 assigned to the assignee of the present invention. However, since in the example described above, the holes to be drilled fully traverse the workpiece, only a start-stop control is desirable and an automatic variation of the amount of vertical feed is not needed.

The machine and control system according to Figs. 3 and 4 operates as follows:

The workpiece 31 to be finished by drilling the transverse holes 13' through the disc structure is fastened to the workpiece carrier 30 of the machine in geometrically centered relation thereto, and is then driven by motor 30d to rotate at the proper speed of the balance measuring run. If the workpiece is unbalanced, the assembly of the spindle 30a with carrier 30 and workpiece 31 performs linear oscillations. As mentioned, the control rheostat 403a has previously been set to a predetermined position corresponding to the calculated or measured spacing of the gravity center of the holes to be drilled from the axis of rotation. The unbalancing responsive oscillations are sensed by the pickup 403 which translates them into a corresponding alternating voltage. This voltage, modified in accordance with the setting of control rheostat 403a, is impressed upon the moving coils 401a and 402a.

At the same time the field coils 401h and 402v receive sine current and cosine current respectively from the phase reference 456. As a result, the moving coil 401a and contact arm 401c of instrument 401 deflect an angular amount proportional to the magnitude of the workpiece unbalance. Simultaneously the moving coil 402a and the arm 402c tend to deflect in dependence upon the magnitude of the unbalance in a coordinate direction perpendicular to the unbalance component to which the instrument 401 is responsive.

Assume that the contact arm 401c on moving coil 401a thus deflects to the contact 401x, and that contact arm 402c on moving coil 402a deflects into engagement with one of the two contacts 402e, 402f.

The pulse transmitter 407, periodically closing its contact 407c, now passes control pulses through lead 402d, arm 402c, and the engaged contact 402e or 402f, and the one appertaining lead 406c to the relay 406 which closes one of its contacts 406a, 406b and energizes the worm drive motor 404 to run in the forward or reverse direction depending upon which of contacts 402e and 402f is active at that time. The worm 34 is rotated until the stator 456a of the phase reference generator 456 is turned to the angular position that corresponds to the angular position of the unbalance in workpiece 31. When this stator position is reached, the component pickup voltage has reached such a phase position to the reference cosine current in field coils 402v of instrument 402 that the geometric product of pickup voltage and reference current is zero. The moving coil 402a therefore returns to zero position and contact arm 402c now comes to standstill between the fixed contacts 402e and 402f so that relay 406 drops off and stops the worm drive motor 404. However, the contact arm 402c in instrument 402 now connects the lead 401d at 402m to the negative bus of current supply line 410 and passes a current through the contact member 401b which now is energized to arrest the arm 401c in instrument 401 in the deflected position.

The arresting action effected by member 401b may be produced as illustrated by Figs. 15 and 16 in Patent 2,722,830 assigned to the assignee of the present invention.

The above-described rotation of the stator 456a by the worm drive motor 404 also has the effect of angularly shifting the contact pair 456d and places it to the angular position required for latching the workpiece 31 in the correct angular position by means of the stopping device 30h, 30g, 30k. As long as the moving coil 402c remains in zero position, the contact arm 401c of instrument 401 remains engaged with the bank contact 401x because, as mentioned, the member 401b receives voltage and retains the arm 401c.

The drive motor 30d (Fig. 3) of the balancing machine is now supplied with low voltage and slowly rotates the spindle 30a with the workpiece 31 until the cam 456c closes the contacts 456d and thus energizes the stop magnet 435 which then actuates the lever 35a (Fig. 3), provided the centrifugal switch 456e permits such actuation. As soon as the stop magnet 435 responds, the motor 30d is automatically disconnected from its power supply and comes to a stop.

The above-described low-speed control of drive motor 30d may be effected, for example, as follows. The stop magnet 435 is shown provided with a normally closed contact 435a which controls the coil circuit of a contactor 435b for starting and stopping the motor 30d. The coil circuit also comprises, in series with contact 435a, an "On" button and an "Off" push button, the "On" button being connected in parallel to a self-holding contact 435c of the contactor 435b. For starting the motor 30d to turn the spindle 30 with the workpiece as described above, the attendant depresses the "On" button, although this button may also be replaced by a normally open contact of the time-delay relay energized by the closing of the contact device 456d, so that the motor 30d will be started fully automatically. As soon as the contactor 435b picks up, it closes its self-holding contact 435c so that the motor 30d will continue running after the On button is released. The motor can be stopped at will be depressing the Off button. Normally, however, the motor is stopped automatically in the above-described manner as soon as the stop magnet 435 responds and, while arresting the workpiece in the correct machining position, also opens the contact 435a thus stopping the drive motor 30d.

The workpiece 31 is now rigidly secured in the correct angular position beneath the machining device 37e. Consequently, one of the prerequisites for the performance of the desired machining operation according to the invention is satisfied. It is now also necessary to automatically obtain the correct de-centering of the machining device. This takes place as follows.

As soon as the contact arm 402c in instrument 402 has established a connection of the supply line 410 and the lead 401d to the arresting member 401b of instrument 401, the bank contact 401x engaged by the contact arm 401c calls the corresponding bank contact 405x in stepping device 405 by applying the positive potential of the supply line 410 through manifold lead 405y to contact 405x. After the stepping device 405 is placed in operation by the closing of the above-mentioned switch 405e which, as explained, is preferably done automatically by a timing device to occur a given period of time after commencement of the balancing operation, the contact arm 405a advances stepwise toward the preselected contact 405x, and the arm 405c, connected with arm 405a, is angularly displaced simultaneously. The stepping travel of arms 405a and 405c is effected by the alternating play of stepping magnet 405g and self-interrupter contact 405d as explained above, and contaínues until arm 405a reaches the bank contact 405x. Then the relay 405f is energized and opens its main contact thus stopping the further operation of the stepping magnet 405g. The travel distance from contact 0 to contact 405x in the stepping device 405 corresponds to the required amount of de-centering displacement determined by the wattmetric instrument 401 under the effect of the sensitivity control corresponding to the selected setting of the control rheostat 403a. The arm 405c now is displaced to a position relative to limit switch 409 that corresponds to the required amount of de-centering displacement.

When the stepping device 405 has reached the setting just mentioned, the switch 413a is closed. This energizes the coil 413b of contactor 413 which picks up and energizes the tool setting motor 37c for displacing the tool support 37 horizontally along the machine base 33b a distance corresponding to the amount of de-centering required.

While the switch 413a may be closed manually after the stepping operation is completed, it is preferable to effect the closing of switch 413a automatically. This can be done by using an electromagnetic relay 413b which becomes energized by the closing of a normally open contact in relay 405f as soon as the latter relay picks up and stops the stepping device 405. The relay 413b, preferably of the time-delay type, then closes the switch contact 413a together with a self-holding contact 413c which causes the relay 413b to remain energized when thereafter the relay 405f drops off. Consequently, the contactor 413 will remain picked up until its coil circuit is interrupted by the opening of limit switch 409. The relay 413b can then be reset by actuating a reset push-button contact 413d.

While the drill setting motor 37c is in operation due to the closing of switch contact 413a, the pulse transmitter 457 coupled with the feed screw spindle 37a is actuated and issues pulses to the stepping magnet 405g as soon as the switch contact 405h₁ is switched over to the terminal 457g. Simultaneous with such switching of contact 405h₁, the contact 405h₂ (located between the instruments 401, 402) is placed from the illustrated closed position into the open position. The two contacts 405h₁ and 405h₂ are preferably designed as a two-pole switch which is located in the horizontally travel path of the tool support 37 so as to be actuated automatically when the support 37, starting from the position of rest and moving toward the workpiece, reaches a predetermined distance from the workpiece axis.

Due to the opening of contact 405h₂, the contact arms 401c and 402c of the wattmetric instruments 401 and 402 become disconnected from the current supply line at the moment when the contact 405h₁ commences to pass pulses from transmitter 457 to the stepping magnet 405. The stepping device now causes its arm 405c to resume its forward travel toward the limit switch 409 until the limit switch is engaged and opened by the arm. Switch 409 then deenergizes the contactor 413 so that the contactor drops out and stops the tool setting motor 37c. Now the machining tools occupy the required position above the workpiece 31. Reverting to the example described above with reference to Figs. 1a to 1c, the tools 37g of the machining device 37e are now off center in accordance with the correct spacing of the bore-hole gravity center $r_1$ from the axis of rotation 14. Hence the predetermined machining, namely the drilling of the holes 13' through the workpiece, can now be effected and will result in finishing and balancing the workpiece.

Figure 5:
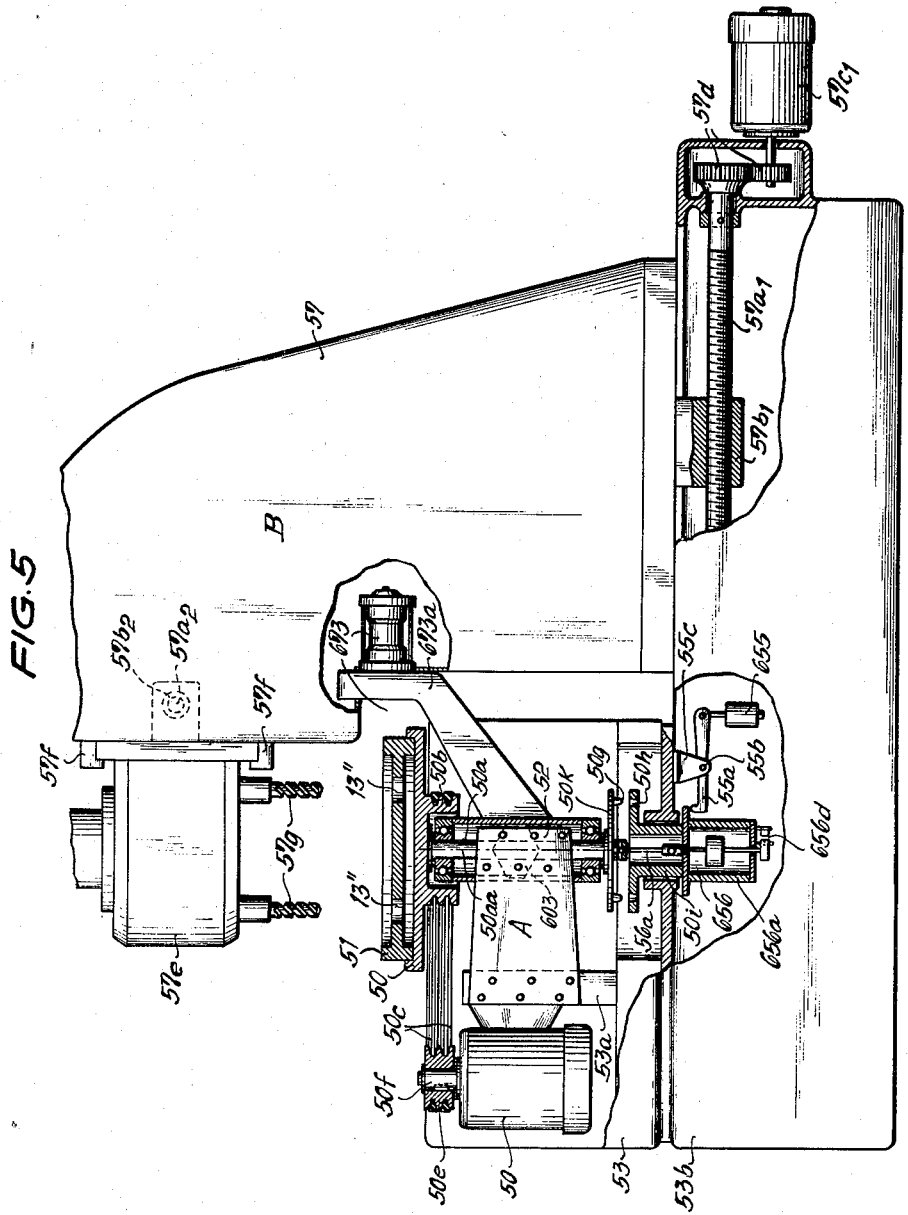
Fig. 5 is a part-sectional side view of another embodiment of a balancing machine according to the invention.
Figure 6:
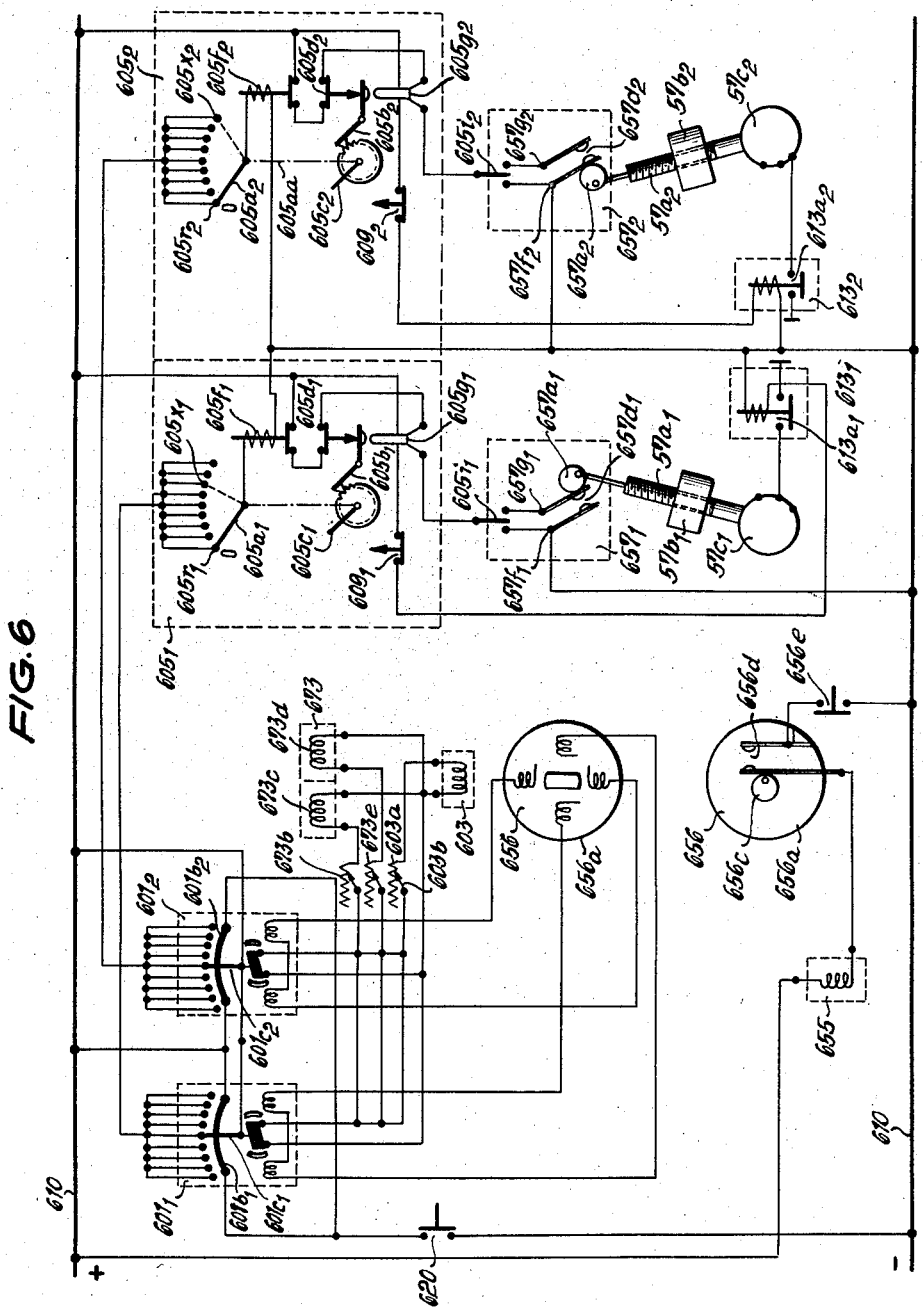
Fig. 6 illustrates components of the same machine in conjunction with a schematic circuit diagram of its electric accessories.

The machine illustrated in Figs. 5 and 6 operates to determine unbalance of the workpiece in accordance with a Cartesian coordinate method as contrasted to the polar coordinate method embodied in the machine of Figs. 3 and 4. The design and operation of the measuring and control components in the machine of Figs. 5 and 6 are to a great extent similar to those in the machine according to Figs. 3 and 4 so that hereinafter mainly the differences between the two machines will be described in detail. The similarities are apparent from the choice of the reference characters used in Figs. 4 and 5. Items denoted in Figs. 3, 4 by reference characters whose first digit is "3" and "4" are denoted in Figs. 5, 6 by the same reference characters except that the first digit is substituted by "5" and "6" respectively. In most cases the first digit indicates the particular figure in which the item is best apparent. For example, the machining unit $57e$ in Fig. 5 corresponds to the unit $37e$ in Fig. 3; the motor $50d$ in Fig. 5 to the motor $30d$ in Fig. 3, the spindle $50a$, pickup $603$, generator $656$ and stop magnet $635$ in Figs. 5 and 6 correspond to the respective components $30a$, $403$, $456$, $435$ in Figs. 3, 4.

In the machine of Figs. 5 and 6, contrary to the one described previously, the stator $656a$ of the auxiliary phase-reference generator $656$ is rigidly mounted on the frame structure $53$ (Fig. 5) of the machine and hence is not displaceable angularly. Accordingly, the arresting disc $50h$ for engagement by the bosses $50g$ of the stop disc $50k$ is only vertically displaceable into and out of clutching engagement with the stop bosses $50g$, but is not rotatable about the axis of spindle $50a$. When the disc $50h$ is lifted under control by the stop magnet $635$, the spindle $50a$ and hence the workpiece $51$ are stopped in a single predetermined angular position relative to the frame structure $53$ and hence relative to the tool support $37$.

The amount of discrepancy $R_1$ between the center of gravity $S_1$ (see Figs. 1, 2) of the disc-shaped workpiece $51$ is determined in the known manner by resolving it into two coordinate components extending preferably at a right angle to each other. The magnitude of these two Cartesian components is individually measured by respective two instruments, namely two wattmeters $601_1$ and $601_2$. The two wattmetric instruments thereafter take care of controlling, respectively, the horizontal (longitudinal) displacement of the tool support $57$ relative to the machine-base $53b$, and the transversal setting of the tool carrier $57e$ relative to the support $57$. The longitudinal setting of support $57$ is controlled by a motor $51c_1$ operating through a spur gear transmission $57d$ upon the longitudinal feed-screw spindle $57a$ engaged by a nut member $57b_1$ of support $57$ (Figs. 5, 6). The tool carrier $57e$, which is horizontally displaceable on guide rails $57f$ (Fig. 5) in direction transverse to the feeding travel of the support $57$ in the conventional manner, is displaced along its travel path by means of another motor $57c_2$ (Fig. 6) which drives a transversal feed-screw spindle $57a_2$ in threaded engagement with a nut member $57b_2$ of the displaceable tool carrier $57e$ (Figs. 5, 6).

It will be understood that the two feed-screw spindles $57a_1$ and $57a_2$ extend at a right angle to each other as shown in Fig. 5 rather than at the angle apparent from Fig. 6 where the two spindles are shown schematically only for explanatory purposes.

The two motors $57c_1$ and $57c_2$ are controlled by means of respective stepping devices $605_1$ and $605_2$ substantially in the manner described with reference to the control of the feed motor $37c$ by the stepping device $405$ according to Fig. 4. The two stepping devices $605_1$ and $605_2$ have respective contact arms $605a_1$ and $605a_2$ which, after the two wattmeters $601_1$ and $601_2$ are locked with their contact arms $601c_1$, $601c_2$ in unbalance-responsive deflected positions, advance stepwise under control by respective stepping magnets $605g_1$, $605g_2$ until the arms $605_1$, $605_2$ occupy the respective bank contacts $605x_1$ and $605x_2$. When the two stepping devices are thus set, they are subsequently further advanced under control by respective pulse transmitters $657_1$ and $657_2$ in dependence upon the setting travel of the support $57$ and the tool carrier $57e$ respectively.

At the time when the values measured by the wattmeters are translated into the corresponding settings of the two stepping devices $605_1$ and $605_2$, the switches $605i_1$ and $605i_2$ are connected with the terminals $657f_1$ and $657f_2$ respectively. However, as soon as the setting travel effected by the motors $57c_1$ and $57c_2$ commences, the switches $605i_1$ and $605i_2$ are placed into engagement with the respective terminals $657g_1$ and $657g_2$ which may be done by making the switches part of a limit switching device as described with reference to Figs. 3 and 4.

The motors $57c_1$ and $57c_2$ are placed into operation by contactors $613_1$ and $613_2$ as soon as the respective switches $613a_1$ and $613a_2$ are closed. The switches $613a_1$ and $613a_2$, corresponding to switch contact $413a$ in Fig. 4, may form normally open contacts of the respective relays $605f_1$ and $605f_2$.

The manifold leads $605y$ connect the bank contacts of the respective stepping devices $605_1$ and $605_2$ in the same manner as explained above with reference to Fig. 4. As mentioned, the workpiece $51$ beneath the machining tools $57g$ is arrested by the mechanism $50g$–$50h$ always in the same angular position. The wattmeter $601_1$ causes the contact arm $605a_1$ of stepping device $605_1$ to set itself upon a bank contact, such as $605x_1$, so located that the subsequent travel required for further advancing the contact arm until it is reset to zero position is equivalent to the off-center position which the support $57$ is to assume. At the end of the subsequent re-setting travel, the longitudinal setting motor $57c_1$ is automatically stopped by opening of the limit contact $609_1$ actuated by the contact arm $605c_1$. In an analogous manner, the wattmeter $601_2$ causes the stepping device $605_2$ to set its contact arms to a position from which the arm will subsequently travel to the zero position an amount equivalent to the deflection of the contact arm $601c_2$ in instrument $601_2$. Such subsequent travel then controls the operation of the transversal setting motor $57c_2$.

The measuring of the workpiece unbalance and the subsequent de-centering of the tool carrier take place automatically in sequence. After placing the workpiece $51$ into the machine, the starting of the drive motor $50d$ commences the measuring run of the workpiece whose unbalance is translated by the oscillation pickup $603$ into electric alternating voltages which are supplied to the moving coils of the two wattmeters $601_1$ and $601_2$. The subsequent change in mass distribution in the workpiece $51$ by the prescribed machining, namely the drilling of the ventilating holes $13''$, is anticipated by correspondingly setting the tap contact $603b$ of the calibrating control rheostat $603a$. The two alternating currents, generated by the phase transmitter $656$ with 90° phase displacement relative to each other, are passed through the stationary field coils of the respective wattmeters $601_1$ and $601_2$. The deflections of the contact arms $601c_1$ and $601c_2$ in the respective wattmeters are thus equivalent to the off-center spacings required in the two coordinate directions and thus can be used directly for controlling the setting of the support $57$ and of the tool carrier $57e$ respectively.

After the workpiece has performed its measuring run and the two wattmeters are set to deflected positions indicative of the two unbalance components, a switch $620$, which preferably forms part of a timer set in operation by the starting of the drive motor $50d$, applies voltage to the members $601b_1$ and $601b_2$ for arresting the moving-coil arms $601c_1$ and $601c_2$ in deflected positions. Thus the previously determined values of the two unbalance components are kept memorized in the two wattmeters and, in the manner described above, are transferred into equivalent settings of the contact arms $605a_1$ and $605a_2$ of the two stepping devices $605_1$ and $605_2$. Simultaneously with the setting of the stepping devices, the drive motor 50d is either deenergized or is caused to run at slower speed by applying thereto a reduced energizing voltage, so that the workpiece will slowly rotate to the proper arresting position. The just-mentioned switching of the motor 50d to deenergized or low-speed condition may be automatically effected, for example by the timer device that also operates the switch contact 620. If desired, the same timer may also control the subsequent lowering of the drills 57g on to the workpiece 65. The arresting of the rotor in the predetermined angular position is effected by the operation of the stop magnet 635 which may also be used to completely deenergize the slowly running drive motor 50d in the manner described above with reference to Fig. 4.

The transversal displacement of the tool carrier 57e into the correct position above the workpiece 51, the slowing down of the workpiece 51 and the turning of the workpiece into the proper arresting position take place simultaneously.

The machine assembly A—B according to Figs. 5 and 6 thus operates automatically like the machine according to Figs. 3 and 4. Consequently, the servicing of the machine during operation may be limited to placing and clamping the workpiece 51 on the workpiece carrier 50 of the machine, but if desired, this operation can also be performed by automatic means as known for such purposes. After machining of the workpiece, it can be subjected to unbalance checking on the machine A.

The accuracy of the de-centering method, like any other balance-correcting operation performed on a workpiece mounted on an auxiliary spindle, depends upon the quality of the workpiece mounting. If the workpiece is not correctly centered geometrically on the workpiece support or if the journals of the workpiece-holder spindle involve appreciable clearance or tolerance, the ultimate balance correction may exhibit slight errors. In my copending application Serial No. 746,977, filed July 7, 1958, and assigned to the assignee of the present invention, there is disclosed a method and means for eliminating the balancing error due to any such deficiencies in workpiece mounting. A device designed and operative in accordance with the disclosure of said copending application is incorporated in the machine illustrated in Figs. 5 and 6 and will be described presently.

Assume that the workpiece holder 30 (Fig. 3) or 50 (Fig. 5) consist of a three-jaw chuck as customary for lathe work. In such a workpiece holder, a clearance or beat movement of the rotating workpiece in the order of 50 microns is expectable. If this amount of tolerance is not taken into account for the off-center balance correction according to the invention, an error of the same magnitude may remain in the workpiece after completing the balance correction. Now, according to the above-mentioned copending application Serial No. 746,977, an auxiliary pickup or measuring-voltage generator is mounted on a part of the balancing machine that oscillates together with the workpiece due to any workpiece unbalance. Since this pickup participates in the unbalance-responsive oscillations of the workpiece journalling structure, it does not respond to the unbalance but is responsive to any journalling error and issues a voltage equivalent to such error, this voltage being used for correction of the balance measuring results.

In Figs. 5 and 6, the just-mentioned auxiliary pickup for journalling-error correction is shown at 673. The pickup is mounted on an arm 603a rigidly connected with the journalling structure in whose ball bearings the spindle 50a is rotatable. Consequently the pickup participates in any oscillations of the journalling structure that may be caused by unbalance of the rotating workpiece 50. The pickup 673 has a sensing member in engagement with a machined surface of the workpiece that extends concentric to the workpiece axis. In the present case it is assumed that the outer periphery of workpiece 51 is machined and that the sensing member of the pickup 673 is in gliding engagement with that periphery. It will be recognized that if the workpiece 51 were ideally centered with respect to the axis of rotation, the pickup 673 would not sense any oscillations. On the other hand, any of the above-mentioned journalling errors will cause the pickup 673 to generate in its winding 673s (Fig. 6) an alternating voltage indicative of such error. According to Fig. 6, the voltage generated in pickup winding 673c and the voltage of the stationarily mounted pickup 603 are connected in series opposition through adjustable resistors 673b and 603a respectively, with the result of eliminating the unbalance error due to the journalling error sensed by the pickup 673, this error being equal to the weight of the workpiece times the distance between the geometric axis of the workpiece and the axis of the spindle 50a.

If for the purposes of the invention the zero position of the machining tool 37g or 57g were made to be exactly coincident with the axis of rotation 30aa or 50aa of the spindle 30a or 50a, there would occur an error equal to the spacing of the workpiece axis from the axis of spindle rotation times the weight of the intended change in the mass of the workpiece resulting from the prescribed machining. For that reason the oscillatingly supported pickup 673 (Fig. 6) is provided with a second winding 673d. The voltage generated in winding 673d is adjustable by means of a calibrating resistor 673e and serves for correcting the zero point of the measuring instrument $601_1$ or $601_2$ in accordance with the journal error measured by the pickup 673. It is further possible, for avoiding the last-mentioned error, to add to the tool displacement corresponding to a prescribed machining, a travel distance that corresponds to the spacing between the workpiece axis from the spindle axis of the workpiece holder. Such an addition can be effected with the aid of the stepping devices $605_1$ and $605_2$.

It will be understood that the auxiliary oscillation pickup illustrated in Figs. 5 and 6 at 673, may also be used in the same manner in a machine and control system otherwise designed in accordance with Figs. 3 and 4.

The processing example described above with reference to Fig. 2 can be realized with the machines so far described by using a milling machine or the like instead of a drill press, the milling tool operating upon the disc 21 in such a manner that the required spacer ring 26 remains in the position prescribed by the preceding balance measurements.

It will be obvious to those skilled in the art of balancing methods and balancing machines that de-centering problems of various kind can be solved on the basis of the present invention and with the aid of means other than those particularly illustrated and described herein. For example, the polar-type operation described above with reference to the embodiment of Figs. 3 and 4, may readily be performed by arresting the workpiece in a predetermined, fixed angular position and turning the tool carrier into the required angular relation to the arrested workpiece, while also displacing the tool carrier radially for obtaining the desired off-center positioning of the machining tools. Furthermore, instead of arresting the workpiece in a predetermined angular position when operating in accordance with the coordinate-method described with reference to Figs. 5 and 6, the tool carrier can be kept in a fixed position and the workpiece may instead be displaced in two coordinate directions relative to the fixed angular position of the tool carrier. Both methods may further be combined with each other by arresting the workpiece in the measured angular position, then placing the tool carrier into this same angular position, and thereafter displacing either the workpiece or the tool carrier in the other component direction. It will be obvious to those skilled in the art, upon studying this disclosure, that such variations, all corresponding to the basic concept and features of my invention, are readily applicable without departing from the essence of the invention and within the scope of the claims annexed hereto.

I claim:

1. The method of finishing an unbalanced rotor, which comprises the steps of subjecting the rotor to predetermined finishing by machining it at non-coaxial locations so as to change the rotor mass a predeterminately fixed amount; and displacing said locations, prior to said machining, relative to the rotational axis of said rotor to a decentered position, the amount of displacement of said locations being equal to the product of the weight of the rotor times the spacing of the rotor mass from its axis of rotation divided by the weight of material removed by said machining at said noncoaxial locations, whereby said fixed mass change subsequently caused by said predetermined finishing produces balance of said rotor.

2. The method of finishing an unbalanced rotor, which comprises the steps of subjecting the rotor to predetermined finishing by machining it at a given group of locations distributed about the rotor axis and having a fixed spacial relation to each other, so as to change the rotor mass a predeterminately fixed amount; and displacing prior to said machining said group of locations as a whole to a given off-center position relative to the rotational axis of said rotor, the amount of displacement of said locations being equal to the product of the weight of the rotor times the spacing of the rotor mass from its axis of rotation divided by the weight of material removed by said machining at said non-coaxial locations, whereby said fixed mass change subsequently caused by said predetermined finishing produces balance of said rotor.

3. The method of finishing an unbalanced rotor, which comprises the steps of subjecting the rotor to predetermined finishing by machining it at a given group of locations distributed about the rotor axis and having a fixed spacial relation to each other, said machining having at all of said locations a tool feed direction parallel to the rotational axis of said rotor and being adapted to remove a predeterminately fixed amount of mass from said rotor; and displacing prior to said machining said group of locations as a whole to a given off-center position relative to said rotor axis, the amount of displacement of said locations being equal to the product of the weight of the rotor times the spacing of the rotor mass from its axis of rotation divided by the weight of material removed by said machining at said non-coaxial locations, whereby said fixed amount of mass subsequently removed by said predetermined finishing produces balance of said rotor.

4. The method of finishing an unbalanced rotor, which comprises the steps of drilling a predetermined number of holes of given diameter and given axial extent into said rotor in drilling directions parallel to the rotor aixs, said holes being distributed about said axis in a fixed spacial realtion to each other so that the drilling removes a predeterminately fixed amount of material from said rotor; and displacing, prior to drilling, the drilling tools as a group to an off-center position relative to said axis, the amount of displacement of said locations being equal to the product of the weight of the rotor times the spacing of the rotor mass from its axis of rotation divided by the weight of material removed by said machining at said non-coaxial locations, whereby said fixed amount of material subsequently removed by said drilling produces balance of said rotor.

5. The method of finishing an unbalanced rotor by material-removing machine tools, which comprises mounting the unfinished rotor for rotation about its geometric axis and measuring the spacing of its mass center from said axis; determining the mass center of a predeterminately fixed amount of material to be removed from said rotor at respective coaxial locations by said tools; displacing the tools relative to said axis by the amount required to satisfy the equation:

$$S_1 \cdot R_1 = s_1 \cdot r_1$$

wherein $S_1$ is the weight of the rotor, $R_1$ is the spacing of the rotor mass center from its axis of rotation, $s_1$ is the weight of the material to be removed by the tools, and $r_1$ is the required amount of relative displacement; and thereafter finishing the rotor by means of said tools.

6. A machine for machining and simultaneously balancing a rotor, comprising a balancing machine portion and a machine-tool portion having a base structure in common, said balancing machine portion having means for rotating the rotor about its geometric axis and unbalance-responsive measuring means for measuring unbalance of the rotor, said machine tool portion comprising tool means for machining the rotor at non-coaxial locations and having a feed direction parallel to said axis, said tool means being adapted to change the rotor mass a predeterminately fixed amount when in operation, one of said two machine portions being displaceable relative to the other in a radial direction relative to said axis, a drive connected with said one machine portion for displacing it, displacement control means connecting said measuring means with said drive for controlling said drive in dependence upon the amount of unbalance measured by said measuring means, and a sensitivity adjusting member forming part of said control means and adjustable in accordance with the mass centering effect of said fixed amount of change in rotor mass to be produced by said tool means, whereby said member modifies the control of said drive by said control means for causing said drive to displace said one machine portion to a position at which the machining of the rotor by said tool means produces balance of the rotor.

7. A machine for machining and simultaneously balancing a rotor, comprising a balancing machine portion and a machine-tool portioin having a base structure in common, said balancing machine portion having means for rotating the rotor about its geometric axis and unbalance-responsive measuring means for measuring unbalance of the rotor, said machine-tool portion comprising a tool support displaceable on said base structure in a radial direction relative to said axis and tool means mounted on said support and operable upon the rotor at non-coaxial locations, said tool means having a feed direction at an angle to said radial direction and being adapted to change the rotor masss a predeterminately fixed amount, a drive connected with said support for displacing it, dissplacement control means connecting said measuring means with said drive for controlling said drive to displace said support in dependence upon the amount of unbalance measured by said measuring means, and a sensitivity adjusting member forming part of said control means and adjustable in accordance with the mass centering effect of said fixed amount of change in rotor mass to be produced by said tool means, whereby said member modifies the control of said drive by said control means for causing said drive to displace said support to a position at which the machine of the motor by said tool means produces balance of the rotor.

8. In a machine according to claim 6, said measuring means of said balance machine portion comprising two instruments for measuring angular position and magnitude respectively of said rotor unbalance, arresting means for securing the workpiece relative to said tool means in an angular position corresponding to that of said unbalance, and position control means connecting said arresting means with said angular position measuring instrument for control of said arresting means by said latter instrument, said displacement control means being connected with said magnitude measuring instrument to be controlled thereby.

9. In a machine according to claim 7, said measuring means of said balancing machine position comprising two instruments for measuring rectangularly coordinated component magnitudes respectively of said rotor unbalance, arresting means for securing the rotor in a given rotational position during machining, said tool means being displaceable relative to said support at a right angle to said radial direction and having drive means for displacing said tool means, said displacement control means being connected with and controlled by one of said instruments in dependence upon one of said magnitudes, and further control means connecting said other instrument with said drive means for displacing said tool means relative to said support in dependence upon said other magnitude.

10. A machine for machining and simultaneously balancing a rotor, comprising a balancing machine portion and a machine-tool portion having a base structure in common, said balancing machine portion having means for rotating the rotor about its geometric axis and unbalance-responsive measuring means for measuring unbalance of the rotor; said measuring means comprising two wattmetric instruments each having a moving coil and a fixed coil, pickup means responsive to unbalance oscillations of the rotor and electrically connected with said two moving coils to provide them with pickup voltage indicative of the rotor unbalance, a phase reference generator synchronized with the rotor rotating means and having sine-current and cosine-current circuits connected with said respective fixed coils, said generator having a rotatable stator for jointly varying the phase conditions of said respective currents, a reversible control motor connected with said stator for rotating it, said two instruments having respective arms deflectable together with said respective moving coils, one of said instruments having a bank of fixed contacts selectively engageable by its arm, said other instrument having two fixed end contacts selectively engageable by its arm depending upon the direction of arm deflection and having a midcontact in engagement with said arm when said arm is in undeflected position, said motor having motor control means connected to said two end contacts for running said motor in a direction depending upon which end contact is engaged at a time, said one instrument having arresting means for retaining its arm in deflected position, said arresting means being connected to said midcontact to operate when said arm of said other instrument returns to undeflected position due to rotation of said stator; said machine-tool portion comprising a tool support displaceable on said base structure in a radial direction relative to said axis and tool means mounted on said support and operable upon the rotor at non-coaxial locations, said tool means having a feed direction parallel to said rotor axis and being adapted to change the rotor mass a predeterminately fixed amount, a tool setting drive connected with said support for displacing it, and displacement control means connecting said drive with said bank of contacts for controlling said drive to displace said support relative to the rotor to a position corresponding to the arm deflection of said one instrument, whereby the rotor is automatically set to the one angular position and the tool means are set to the one radial position required for eliminating the unbalance by machining the rotor with said tool means.

11. In a machine according to claim 10, said displacement control means comprising a stepping device having a movable contact member and a bank of fixed contacts electrically connected with said respective bank contacts of said one instrument in line-finder connection, so that said contact member seeks a stop position dependent upon the deflection of the arm of said one instrument, said tool setting drive comprising a pulse transmitter operative in accordance with the radial displacement of said support and switch means for starting said drive, said pulse transmitter being electrically connected with said stepping device for resetting said member from said stop position back to zero, and switch means for stopping said drive when said member reaches zero position.

12. A machine according to claim 10, comprising electric sensitivity control means connected with said instruments for modifying the amount of deflection of said instrument arms, said sensitivity control means being adjustable for anticipating the effect of the subsequent machining of the rotor upon its balance condition, whereby the amount of displacement of said support by said drive depends partly upon the selected setting of said sensitivity control means.

13. In a machine according to claim 10, said sensitivity control means consisting of an adjustable resistance device connected between said pickup means and said moving coils.

14. A machine according to claim 10, comprising stop means for retaining the rotor in said one angular position during machining, a stop magnet for controlling said stop means, a contact device having an actuator connected with said generator to operate in synchronism with the rotation of the motor, said contact device having contact means actuable by said actuator and mounted on said stator so as to be actuated at a phase moment of rotation at which the rotor is in said one angular position, said contact means being connected with said stop magnet to actuate said stop means at said moment.

15. In a machine according to claim 7, said measuring means comprising an electric pickup mounted in fixed relation to said base structure and having a pickup voltage corresponding to rotor oscillations due to unbalance, an instrument electrically connected with said pickup for response to said voltage, said sensitivity adjusting member comprising a rheostat interposed between said pickup and said instrument whereby the amount of response of said instrument depends jointly upon the amount of rotor unbalance and upon the setting of said rheostat.

16. A machine according to claim 15, comprising another pickup oscillatingly mounted to participate in unbalance responsive oscillation of the rotor and having a pickup member engageable with the rotor to provide another pickup voltage dependent upon journalling error of the rotor, said other pickup being also connected with said instrument in opposed voltage relation to said first pickup, for modifying its response to said unbalance responsive voltage of the first-mentioned pickup.

17. A machine according to claim 16, comprising another adjustable rheostat connected between said error-responsive other pickup and said instrument.

18. In a machine according to claim 17, said error-responsive other pickup having two voltage output circuits connected with said instrument in parallel relation to each other, said other rheostat being connected in one of said two pickup output circuits, and a third adjustable rheostat connected in said other output circuit for calibrating the zero condition of said instrument.

References Cited in the file of this patent

UNITED STATES PATENTS 2,804,775    Hack ------------------ Sept. 3, 1957